United States Patent
Weischedel et al.

[15] 3,671,853

[45] June 20, 1972

[54] DUAL-OUTPUT REGULATED SWITCHING POWER SUPPLY

[72] Inventors: Herbert Rudolf Weischedel, Rockaway; George Raymond Westerman, Denville, both of N.J.

[73] Assignee: Bell Telephone Laboratories, Incorporated, Murray Hill, N.J.

[22] Filed: Dec. 24, 1970

[21] Appl. No.: 101,318

[52] U.S. Cl. .................................. 323/17, 307/11, 321/2, 323/22 T, 323/38, 323/DIG. 1
[51] Int. Cl. .......................................... G05f 1/56
[58] Field of Search .................... 307/11, 17; 321/2; 323/17, 323/22 T, 38, DIG. 1

[56] References Cited

UNITED STATES PATENTS

| | | | |
|---|---|---|---|
| 3,381,202 | 4/1968 | Loucks et al. | 321/2 |
| 3,237,081 | 2/1966 | Martin | 323/22 T |
| 3,215,925 | 11/1965 | Rieke | 323/22 T |
| 3,328,674 | 6/1967 | Bleicher | 323/22 T |
| 3,569,818 | 3/1971 | Dahlinger et al. | 307/17 X |

Primary Examiner—A. D. Pellinen
Attorney—R. J. Guenther and E. W. Adams, Jr.

[57] ABSTRACT

The duty cycle and frequency of a switching transistor are individually controlled by separate feedback loop to give two independently regulated output voltages. The main output is controlled by the duty cycle feedback loop in a conventional manner. The auxiliary output is fed by a frequency-to-voltage converter and has a voltage-to-frequency converter in its feedback loop.

7 Claims, 3 Drawing Figures

3,671,853

INVENTORS
H. R. WEISCHEDEL
G. R. WESTERMAN

BY
*Joseph Q Cameron*
ATTORNEY

DUAL-OUTPUT REGULATED SWITCHING POWER SUPPLY

BACKGROUND OF THE INVENTION

This invention relates to switching voltage regulators and more particularly to switching regulators with controlled switching frequency.

Because of their simplicity, efficiency, and low cost, switching voltage regulators are used in untold thousands of applications where close control of voltage is desired. Where once a large single voltage regulator was used to control the supply voltage of many circuits of a system, today many smaller voltage regulators are used to each control the voltage of an individual circuit. Designers have found that the increased flexibility and better voltage regulation obtained at the individual circuit input often outweigh the added cost of individual switching regulators. Any innovation that can substantially reduce the unit cost of such switching regulators without impairing their efficiency or effectiveness will therefore be extremely useful either in reducing overall system cost or in allowing the designers to further decentralize power processing.

An object of this invention is to reduce the unit cost of individual voltage regulators.

Another object of this invention is to provide two individual regulated output voltages from a single switching regulator.

A third object is to provide two regulated outputs of independent polarity utilizing the same switching transistor.

Another object is to reduce the number of voltage regulators required in electronic systems.

SUMMARY OF THE INVENTION

Two independently regulated outputs are driven from a single switching stage by utilization of the principle that a simple ON-OFF switch operates with two independently controllable characteristics – duty cycle and frequency. A switch for connecting the DC input to the output circuit that includes a first output terminal is driven alternately open and closed by a driver. A duty cycle feedback path connected between the first output terminal and the driver adjusts the duty cycle of the switch to regulate the voltage at the first output terminal. A frequency sensor coupled to the output circuit provides an output voltage at a second output terminal that is responsive to the switching frequency. The switching frequency is adjusted to regulate the voltage at the second output terminal by a frequency feedback path connected between the second output terminal and the driver.

DETAILED DESCRIPTION

Figure 1:
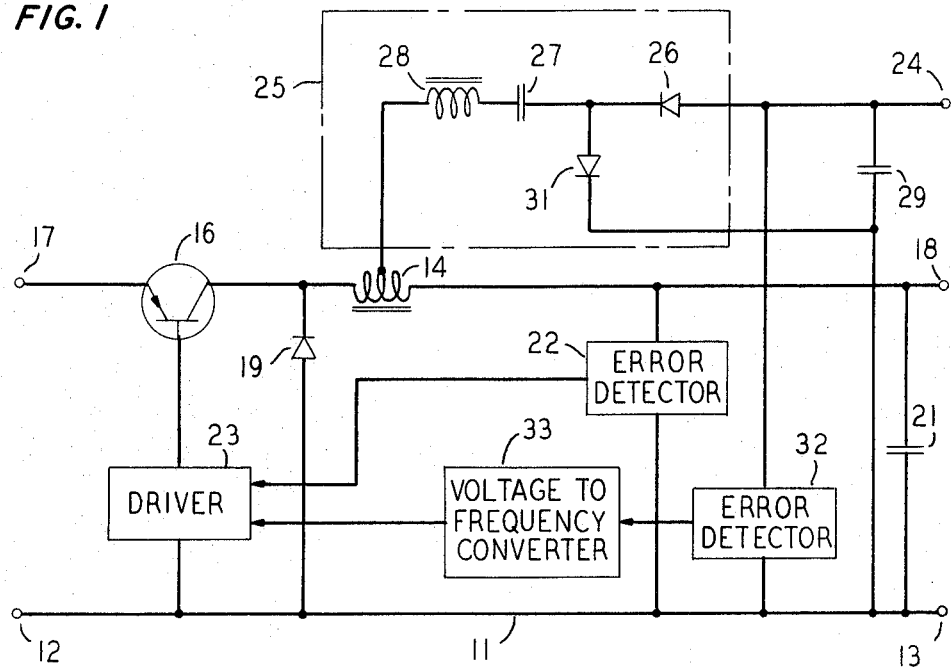
FIG. 1 is a partly schematic, partly block diagram of a useful embodiment of the invention.

In the embodiment of FIG. 1, a common conductor 11 connects an input terminal 12 and an output terminal 13. The series combination of a tapped inductor 14 and the emitter-collector path of a switching transistor 16 is connected between the other input terminal 17 and the main output terminal 18. A diode 19 is connected between common conductor 11 and the collector of transistor 16 and is poled with its anode at the end connected to conductor 11. A capacitor 21 is connected across output terminals 13 and 18. An error detector 22 is connected between terminals 18 and 13 and to a driver 23, which in turn is connected between common conductor 11 and the base of transistor 16. An auxiliary output terminal 24 is connected through the series combination of a diode 26, a capacitor 27 and an inductor 28 to the tap on inductor 14. A capacitor 29 is connected between output terminals 24 and 13, and a diode 31 is connected from the cathode of diode 26 to output terminal 13. Finally, an error detector 32 is connected between output terminals 24 and 13 and to a voltage-to-frequency converter 33 which in turn is connected to driver 23.

The circuit of FIG. 1 operates to provide two independent regulated outputs. Output 18 provides the main or higher current regulated output in a manner somewhat typical of self-oscillating switching regulators. When power is applied to input terminals 12 and 17, switching transistor 16 turns ON to start to charge capacitor 21 through inductor 14. Error detector 22 compares the voltage across capacitor 21 with a reference voltage. When the voltage on capacitor 21 exceeds the reference voltage by a predetermined amount, the signal output from the error detector causes the driver 23 to turn transistor 16 OFF. Similarly, when the voltage on capacitor 21 drops below the reference voltage by a second predetermined amount, the lower output from error detector 22 causes driver 23 to turn switching transistor 16 ON.

The remainder of the circuit produces and controls the auxiliary output at terminal 24. Box 25, which includes inductor 28, capacitor 27, and diodes 26 and 31, is a frequency sensor, or a frequency-to-voltage converter. The series combination of capacitor 27 and inductor 28 form a resonant circuit with minimum impedance at series resonance. The two diodes 26 and 31 form a rectifier to provide DC output at terminal 24. Since the impedance of the LC combination of 27 and 28 is a function of frequency, the output voltage at terminal 24 is also a function of frequency. The curves of FIG. 2, which are plots of output voltage at terminal 24 against switching frequency, show this relationship. Curve 41 is representative of a lower impedance load, for example, 25 ohms, while curve 42 applies to a higher impedance load, for example, 50 ohms. The operating range is chosen to be on the nearly linear portion of the curves, and therefore completely on one side of resonance. For a design switching frequency of 20 kHz, indicated by dotted line 43, and a dynamic range of ±2kHz for regulation, indicated by dotted lines 44 and 46, a resonant frequency of approximately 16 kHz may be chosen. Under these conditions, a shift in switching frequency from 18 to 22 kHz with no change in load will produce a change in output voltage at terminal 24 from 6 to 5 volts. It can also be seen from the curves of FIG. 2 that a change in load from 50 ohms to 25 ohms will cause no change in output voltage if it is accompanied by a frequency shift from 22 to 18 kHz.

In the circuit of FIG. 1, error detector 32 and voltage-to-frequency converter 33 provide the necessary feedback control of frequency to hold the voltage at auxiliary output terminal 24 substantially constant. Error detector 32 emits a voltage signal that is proportional to the difference between the voltage at terminal 24 and a reference voltage. Converter 33 transmits to driver 23 a driving signal having a frequency that is a function of the voltage of the signal from error detector 32.

The switching frequency of switching transistor 16 is therefore controlled by error detector 32, and the auxiliary output voltage 24 is a function of the switching frequency. In like manner, the duty cycle of switching transistor 16 is controlled by error detector 22, and output 18 is a function of the duty cycle. We therefore have two independent voltages controlled by closed feedback loops utilizing a single switching circuit. Each output voltage can be made separately adjustable, and their polarities may be identical or opposite. This can reduce by one half the number of switching transistors needed for a system requiring several regulated voltages. Appreciable savings can be effected with no degradation in performance.

FIG. 1 shows the auxiliary output circuit connected to the tap on inductor 14 in the main output circuit. The invention is not limited to this very simple construction, however; the coupling between the frequency sensing circuit 25 and the main output circuit may be accomplished in other well-known ways. For example, transistor 16 may control the primary current of a transformer with frequency sensor 25 connected to a secondary winding; output 18 may be fed from the primary or another secondary winding.

Other well-known frequency sensing circuits may also be used in place of that shown within block 25. They may produce either an increase or decrease in output voltage with an increase in switching frequency. Furthermore, the polarities of diodes 26 and 31 may be reversed to provide a positive voltage at terminal 24. Converter 33, however, must provide negative feedback control. That is, if converter 25 provides an increase in negative output voltage with a decrease in switching frequency, converter 33 must provide an increase in driving frequency with the resulting more negative error voltage. If the polarities of diodes 26 and 31 are reversed, changing the polarity of output voltage 24 to positive, a decrease in switching frequency will cause a more positive output voltage. This will require a reversal of the slope of either converter 25 or converter 33.

Figure 2:
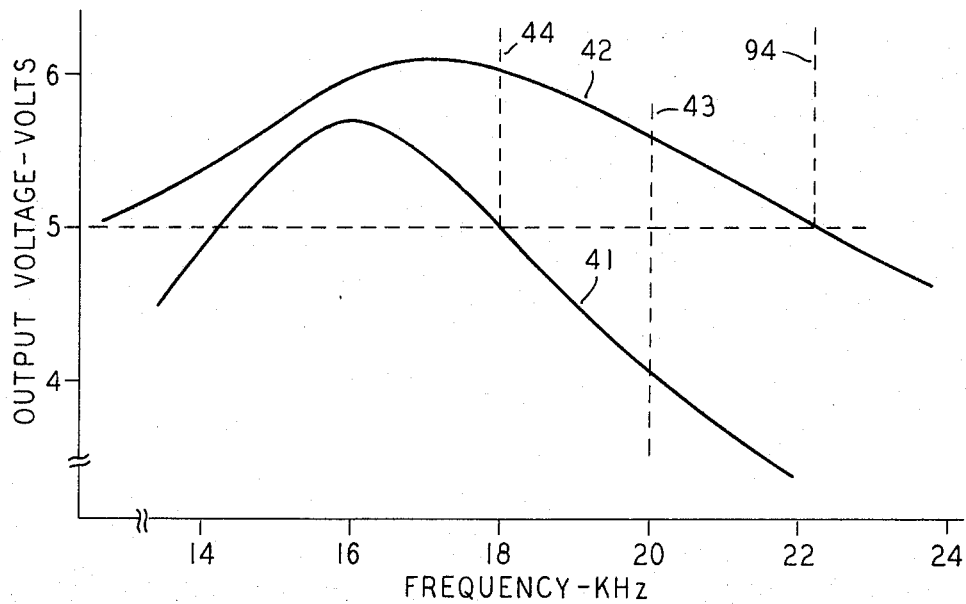
FIG. 2 is a plot of voltage against frequency that is useful to explain the operation of the embodiment of FIG. 1.
Figure 3:
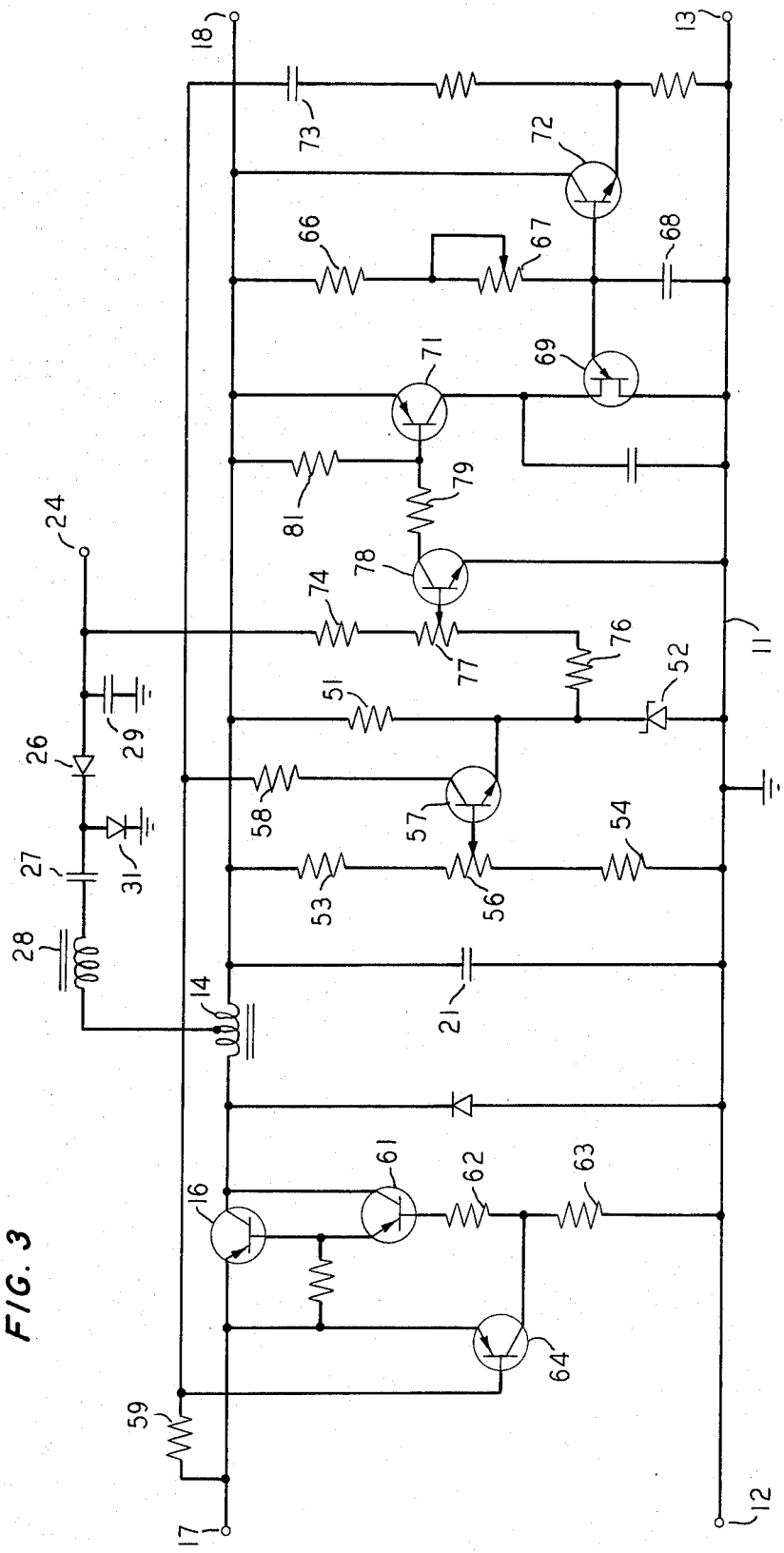
FIG. 3 is a wholly schematic diagram of a particularly useful embodiment of the invention.

A more detailed diagram including circuits that may be used in the blocks of FIG. 1 is given in FIG. 3. In this figure, components similar to those in FIG. 2 are given the same numbers. For frequency and duty cycle control, this particular circuit utilizes the principles of a synchronized switching regulator that is described in more detail in a copending application by the co-inventors of this application, Ser. No. 101,344, filed Dec. 24, 1970. A synchronizing signal from a separate oscillator is added to the feedback signal from the main output to drive the switching transistor. Thus, although the regulator is basically self-oscillating, it is synchronized to the frequency of the separate oscillator.

In FIG. 3, as part of the error detector shown as block 22 in FIG. 1, the series combination of a resistor 51 and a zener diode 52 are connected between output terminal 18 and grounded common conductor 11. Resistor 51 is chosen according to usual practice to keep zener diode 52 operating in its breakdown range to provide a source of constant reference potential. A voltage divider consisting of two resistors, 53 and 54, and a potentiometer 56, is also connected between output terminal 18 and ground. The base of an error detector transistor 57 is connected to the tap of potentiometer 56; the emitter of transistor 57 is connected to the cathode of zener diode 52, and the collector is connected through resistor 58 and 59 to input terminal 17. When the output voltage at terminal 18 rises so that the base of transistor 57 is more positive than the zener diode reference potential, transistor 57 conducts to provide a voltage drop across resistors 59 and 58.

Driver 23 is made up of two transistors 61 and 64 in the embodiment of FIG. 3. The emitter-collector path of transistor 61 is connected between base and collector of switching transistor 16 to form a Darlington pair. The base of transistor 61 is connected through resistors 62 and 63 to ground. The collector-emitter path of transistor 64 is connected from input terminal 17 to the junction between resistors 62 and 63, and its base is connected to the junction between resistors 59 and 58 to provide the first driving stage. An increase in the voltage drop across resistor 59 increases the forward bias on transistor 64. As transistor 64 turns ON, the current normally flowing through the emitter-base path of transistors 16 and 61 and resistor 62 is diverted through the emitter-collector path of transistor 64, turning OFF transistors 61 and 16. In like manner, a decrease in the voltage across resistor 59 decreases the current through transistor 64 to turn ON transistor 16. A slight increase in voltage at output 18 therefore turns OFF transistor 16 and a slight decrease turns it ON. There is enough gain and phase shift in this feedback loop to keep transistor 16 switching ON and OFF in self-oscillation with only a few millivolts ripple at terminal 18.

Voltage-to-frequency converter 33 in this embodiment takes the form of a voltage-controlled relaxation oscillator. A timing circuit comprising a resistor 66, a variable resistance 67, and a capacitor 68 is connected between terminal 18 and ground. The emitter-base 1 junction of a unijunction transistor 69 is connected across timing capacitor 68. Base 2 of unijunction transistor 69 is connected to output terminal 18 through the collector-emitter path of a control transistor 71. The voltage across capacitor 68 therefore continually increases at a rate determined by the RC time constant until it reaches the emitter breakdown potential of unijunction transistor 69. At this point, capacitor 68 rapidly discharges through unijunction transistor 69 until the unijunction transistor extinguishes and immediately starts its recharging cycle. The conduction of control transistor 71 controls the voltage on base 2 of the unijunction transistor and therefore the the unijunction breakdown potential. If transistor 71 is made more conductive, the base 1 to base 2 voltage of transistor 69 is increased, increasing the breakdown voltage. Since the charging rate of capacitor 68 is fixed, it takes longer to reach the higher breakdown voltage of unijunction transistor 69, and the frequency of oscillation is decreased. An emitter-follower connected transistor 72 applies the sawtooth waveform developed across capacitor 68 through capacitor 73 to the base of transistor 64, adding the oscillator voltage to the feedback voltage from error detector 22.

Error detector 32 of FIG. 1, that controls the feedback from the auxiliary output 24, utilizes in the embodiment of FIG. 3 the same reference voltage source as error detector 22, namely, zener diode 52. Two resistors 74 and 76 and a potentiometer 77 connect output terminal 24 with zener diode 52. These resistors will also have to be considered, of course, in choosing resistor 51 to keep zener diode 52 in its breakdown range. The tap of potentiometer 77 is connected to the base of a second error detector transistor 78. The emitter of transistor 78 is connected to ground; the collector is connected through two resistors 79 and 81 to output terminal 18. The base of transistor 71 is connected to the junction between resistors 79 and 81. This completes the feedback loop from auxiliary output terminal 24.

With the left end of resistor 76 holding at the constant positive potential of zener diode 52, a portion of any voltage change at output terminal 24 is applied to the base of transistor 78. If that voltage momentarily becomes more negative, reducing the collector current of transistor 78, the resulting decrease in voltage drop across resistor 81 reduces the base 2 voltage of unijunction transistor 69. As previously discussed, this increases the oscillator frequency. The resulting increased switching frequency produces a lower magnitude of auxiliary output voltage. With the diode polarity shown, that amounts to a less negative output voltage, correcting the original condition. It will be readily recognized that the frequency of the relaxation oscillator could also be controlled by utilizing a transistor to vary the charging time constant of capacitor 68 instead of the breakdown voltage of unijunction transistor 69. This would of course require a phase reversal somewhere in the feedback loop.

In the embodiment of FIG. 3 the synchronizing signal from the relaxation oscillator is a sawtooth waveform with the sharper pulse in the negative direction. This has the effect of turning OFF transistor 16 in synchronism with the relaxation oscillator. Transistor 16 is then turned ON in accordance with the demands of the duty cycle output from main output terminal 18. If the opposite polarity synchronizing waveform were used, as caused for instance by another stage of amplification in the feedback loop, transistor 16 would turn ON in synchronism with the oscillator and OFF in accordance with the demands of the duty cycle feedback loop. Under either condition, and indeed with even a sine wave synchronizing signal, the frequency and the duty cycle of the switching are separately controlled and do not interfere with one another.

While the synchronized self-oscillating type switching regulator is well suited to the practice of this invention and provides rapid recovery from line or load transients, it is apparent that driven type regulators may also be used, the frequency control feedback loop controlling the oscillator driver.

What is claimed is:

1. A dual-output voltage regulator comprising input means for connection to a DC voltage source, an output circuit, switching means for connecting said input means to said output circuit, driving means connected to said switching means for alternately opening and closing said switching means, first output means including a first output terminal coupled to said output circuit for providing a first output voltage responsive to the duty cycle of said switching means, second output means including a second output terminal coupled to said output circuit for providing a second output voltage responsive to the switching frequency of said switching means, duty cycle feedback means connected from said first output terminal to said driving means for adjusting the duty cycle of said switching means to regulate the voltage at said first output terminal, and frequency feedback means connected from said second output terminal to said driving means for adjusting the frequency of said switching means to regulate the voltage at said second output terminal.

2. A dual-output voltage regulator as in claim 1 wherein said output circuit includes a tapped inductor connected between said switching means and said first output terminal having a tap connected to said second output means.

3. A dual-output voltage regulator as in claim 1 including a source of reference voltage common to said duty cycle feedback means and said frequency feedback means.

4. A dual-output voltage regulator as in claim 1 wherein said duty cycle feedback means includes sufficient gain and phase shift to sustain self-oscillation in the switching of said switching means.

5. A dual-output voltage regulator as in claim 4 wherein the feedback signals produced by said duty cycle feedback means and said frequency feedback means are added to produce one driving signal.

6. A dual-output voltage regulator comprising input means for connection to a DC voltage source, an output circuit, switching means for connecting said input means to said output circuit, driving means connected to said switching means for alternately opening and closing said switching means, first output means including a first output terminal coupled to said output circuit for providing a first output voltage responsive to the duty cycle of said switching means, second output means including a second output terminal coupled to said output circuit for providing a second output voltage responsive to the switching frequency of said switching means, duty cycle feedback means connected from said first output terminal to said driving means for adjusting the duty cycle of said switching means to regulate the voltage at said first output terminal, and frequency feedback means connected from said second output terminal to said driving means for adjusting the frequency of said switching means to regulate the voltage at said second output terminal, said frequency feedback means comprising an error detector connected to said second output terminal for producing an error voltage proportional to the amount by which the voltage at said second output terminal exceeds a predetermined value, and frequency generating means connected between said error detector and said driving means for emitting a periodic signal having a frequency that varies in response to said error voltage.

7. A dual-output voltage regulator as in claim 6 wherein said frequency generating means comprises a relaxation oscillator having a breakdown voltage that varies in response to said error voltage.

* * * * *